United States Patent
Greenfield

(10) Patent No.: US 10,375,429 B1
(45) Date of Patent: Aug. 6, 2019

(54) VIRTUAL COMMUNAL VIEWING OF TELEVISION CONTENT

(71) Applicant: CSC Holdings, LLC, Bethpage, NY (US)

(72) Inventor: Jonathan Greenfield, Miller Place, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 15/257,509

(22) Filed: Sep. 6, 2016

Related U.S. Application Data

(63) Continuation of application No. 14/247,092, filed on Apr. 7, 2014, now Pat. No. 9,456,235, which is a continuation of application No. 13/042,966, filed on Mar. 8, 2011, now Pat. No. 8,848,024.

(51) Int. Cl.
| | |
|---|---|
| *H04N 21/242* | (2011.01) |
| *H04N 21/472* | (2011.01) |
| *H04N 21/6587* | (2011.01) |
| *H04N 21/2387* | (2011.01) |
| *H04N 21/81* | (2011.01) |
| *H04N 21/45* | (2011.01) |

(52) U.S. Cl.
CPC ....... *H04N 21/242* (2013.01); *H04N 21/2387* (2013.01); *H04N 21/4532* (2013.01); *H04N 21/47202* (2013.01); *H04N 21/6587* (2013.01); *H04N 21/812* (2013.01)

(58) Field of Classification Search
CPC .................................................. H04N 21/242
USPC ....... 348/14.04, 14.08, 14.09; 386/239, 296; 709/246, 205, 248; 715/834, 719; 725/28, 34, 39, 60, 87, 89, 100, 110, 131, 725/135, 139, 36, 42, 115, 105, 116
See application file for complete search history.

(56) References Cited

U.S. PATENT DOCUMENTS

| | | | | | |
|---|---|---|---|---|---|
| 5,973,683 | A | * | 10/1999 | Cragun | H04N 7/163 348/E7.061 |
| 6,064,376 | A | * | 5/2000 | Berezowski | H04N 5/44543 348/E5.104 |

(Continued)

FOREIGN PATENT DOCUMENTS

WO    WO2005/096626 A2    10/2005

OTHER PUBLICATIONS

English-language Abstract for WO 2005/096626 A2, published Oct. 13, 2005, accessed from espacenet Database-Worldwide.

*Primary Examiner* — Gerald Gauthier
(74) *Attorney, Agent, or Firm* — Sterne, Kessler, Goldstein & Fox P.L.L.C.

(57) ABSTRACT

System, method, and computer program product embodiments are described for viewing synchronized content. An embodiment operates by establishing a viewing party to view synchronized content. Then, viewing party characteristics associated with the viewing party are received. Then, a piece of content relevant to the one or more viewers of the viewing party is selected using the received viewing party characteristics. Then, the embodiments operates by synchronizing display of the selected piece of content at set-top boxes (STBs) of corresponding viewers in the viewing party, where control of the synchronously displayed piece of content is provided to one or more viewers within the viewing party.

19 Claims, 11 Drawing Sheets

(56) References Cited

U.S. PATENT DOCUMENTS

| | | | |
|---|---|---|---|
| 6,075,551 A * | 6/2000 | Berezowski | H04N 5/44543 348/722 |
| 6,813,775 B1 | 11/2004 | Finseth et al. | |
| 6,944,880 B1 | 9/2005 | Allen | |
| 7,114,172 B2 | 9/2006 | Lord | |
| 7,266,834 B1 | 9/2007 | Lund et al. | |
| 7,269,338 B2 | 9/2007 | Janevski | |
| 7,571,458 B1 | 8/2009 | Eyal | |
| 7,711,774 B1 * | 5/2010 | Rothschild | H04N 7/173 709/205 |
| 7,716,376 B1 | 5/2010 | Price et al. | |
| 7,885,517 B2 * | 2/2011 | Blackketter | H04N 5/44513 386/200 |
| 7,921,440 B1 * | 4/2011 | Kolde | H04N 21/4263 348/460 |
| 7,996,566 B1 * | 8/2011 | Sylvain | H04N 7/15 709/202 |
| 8,161,111 B2 | 4/2012 | Espelien | |
| 8,245,262 B2 | 8/2012 | Kashyap et al. | |
| 8,301,790 B2 | 10/2012 | Morrison et al. | |
| 8,346,067 B2 | 1/2013 | Issa et al. | |
| 8,514,705 B2 | 8/2013 | Niamut et al. | |
| 8,522,276 B2 | 8/2013 | Angiolillo et al. | |
| 8,555,313 B2 | 10/2013 | Newnam et al. | |
| 8,707,382 B2 | 4/2014 | Wollmershauser et al. | |
| 8,739,234 B1 | 5/2014 | Cheung et al. | |
| 8,848,024 B2 | 9/2014 | Greenfield | |
| 8,890,743 B2 | 11/2014 | Friedman | |
| 8,990,317 B2 | 3/2015 | Buyukkoc et al. | |
| 9,001,196 B2 | 4/2015 | Richardson et al. | |
| 9,084,008 B1 | 7/2015 | Greenfield | |
| 9,131,256 B2 | 9/2015 | Hubner et al. | |
| 2002/0049975 A1 * | 4/2002 | Thomas | G06Q 50/34 725/60 |
| 2002/0056136 A1 * | 5/2002 | Wistendahl | G06F 17/30017 725/135 |
| 2002/0108121 A1 * | 8/2002 | Alao | H04N 21/812 725/110 |
| 2003/0182663 A1 | 9/2003 | Gudorf et al. | |
| 2003/0192059 A1 * | 10/2003 | Soloff | H04N 7/17318 725/131 |
| 2004/0032486 A1 * | 2/2004 | Shusman | G06Q 30/02 348/14.09 |
| 2005/0120391 A1 * | 6/2005 | Haynie | H04H 60/07 725/135 |
| 2005/0132420 A1 | 6/2005 | Howard et al. | |
| 2005/0262542 A1 | 11/2005 | DeWeese et al. | |
| 2006/0026302 A1 * | 2/2006 | Bennett | H04L 29/06027 709/246 |
| 2006/0075429 A1 * | 4/2006 | Istvan | H04N 7/163 725/39 |
| 2006/0242674 A1 * | 10/2006 | Medford | H04N 7/52 725/100 |
| 2006/0242683 A1 * | 10/2006 | Medford | H04N 21/2343 725/139 |
| 2007/0079342 A1 * | 4/2007 | Ellis | H04N 5/913 725/89 |
| 2008/0126318 A1 | 5/2008 | Frankovitz | |
| 2008/0307473 A1 | 12/2008 | Allen | |
| 2009/0044216 A1 | 2/2009 | McNicoll | |
| 2009/0049485 A1 * | 2/2009 | Agrawal | H04N 7/108 725/87 |
| 2009/0094656 A1 * | 4/2009 | Carlucci | H04N 7/17318 725/115 |
| 2009/0106792 A1 * | 4/2009 | Kan | H04N 7/17318 725/34 |
| 2009/0183199 A1 * | 7/2009 | Stafford | H04H 60/375 725/34 |
| 2009/0249223 A1 | 10/2009 | Barsook et al. | |
| 2009/0276821 A1 * | 11/2009 | Amento | H04N 7/17318 725/116 |
| 2009/0296799 A1 | 12/2009 | Casas et al. | |
| 2009/0327894 A1 * | 12/2009 | Rakib | G11B 27/34 715/719 |
| 2010/0306655 A1 | 12/2010 | Mattingly et al. | |
| 2010/0319043 A1 * | 12/2010 | Jain | H04N 5/4403 725/110 |
| 2011/0041168 A1 | 2/2011 | Murray et al. | |
| 2011/0119706 A1 | 5/2011 | Scott et al. | |
| 2011/0154417 A1 * | 6/2011 | Civanlar | H04N 7/15 725/105 |
| 2011/0167355 A1 | 7/2011 | Shelansky et al. | |
| 2011/0188831 A1 | 8/2011 | Speasl et al. | |
| 2011/0238753 A1 | 9/2011 | Lueth et al. | |
| 2011/0246908 A1 | 10/2011 | Akram et al. | |
| 2011/0302617 A1 | 12/2011 | Greenfield | |
| 2011/0307403 A1 | 12/2011 | Rostampour et al. | |
| 2012/0175416 A1 | 7/2012 | Gomez et al. | |
| 2012/0189000 A1 | 7/2012 | Rahman et al. | |
| 2012/0229588 A1 * | 9/2012 | Greenfield | H04N 21/25883 348/14.04 |
| 2012/0301104 A1 * | 11/2012 | Dove | G11B 27/034 386/239 |
| 2013/0047123 A1 * | 2/2013 | May | G06F 3/0482 715/834 |
| 2014/0267563 A1 | 9/2014 | Baca et al. | |

\* cited by examiner

VIRTUAL COMMUNAL VIEWING OF TELEVISION CONTENT

CROSS REFERENCE TO RELATED APPLICATIONS

This application is a continuation of U.S. patent application Ser. No. 14/247,092, filed on Apr. 7, 2014, which is a continuation of U.S. patent application Ser. No. 13/042,966, filed on Mar. 8, 2011 and issued as U.S. Pat. No. 8,848,024 on Sep. 30, 2014. The above-mentioned patent applications are herein incorporated by reference in their entirety.

BACKGROUND

Field of the Invention

Embodiments relate generally to television viewing, and more particularly to virtual communal television viewing.

Background Art

Television viewing has become a largely individual experience. Members of a household may have different viewing preferences and may each view television independently using different television sets. For viewers in different households, television systems cannot provide the social experience of communal viewing. However, social interaction remains a compelling enhancement, as evidenced by the popularity of technologies such as interactive gaming services including Xbox LIVE® and PlayStation® Network. For example, a participant can display a program using an Xbox® console and communicate with other participants using Xbox LIVE Voice over Internet Protocol (Voice over IP, VoIP). Thus, it would be desirable to enable users of television content to enjoy the social experience of communal viewing.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

Figure 1:
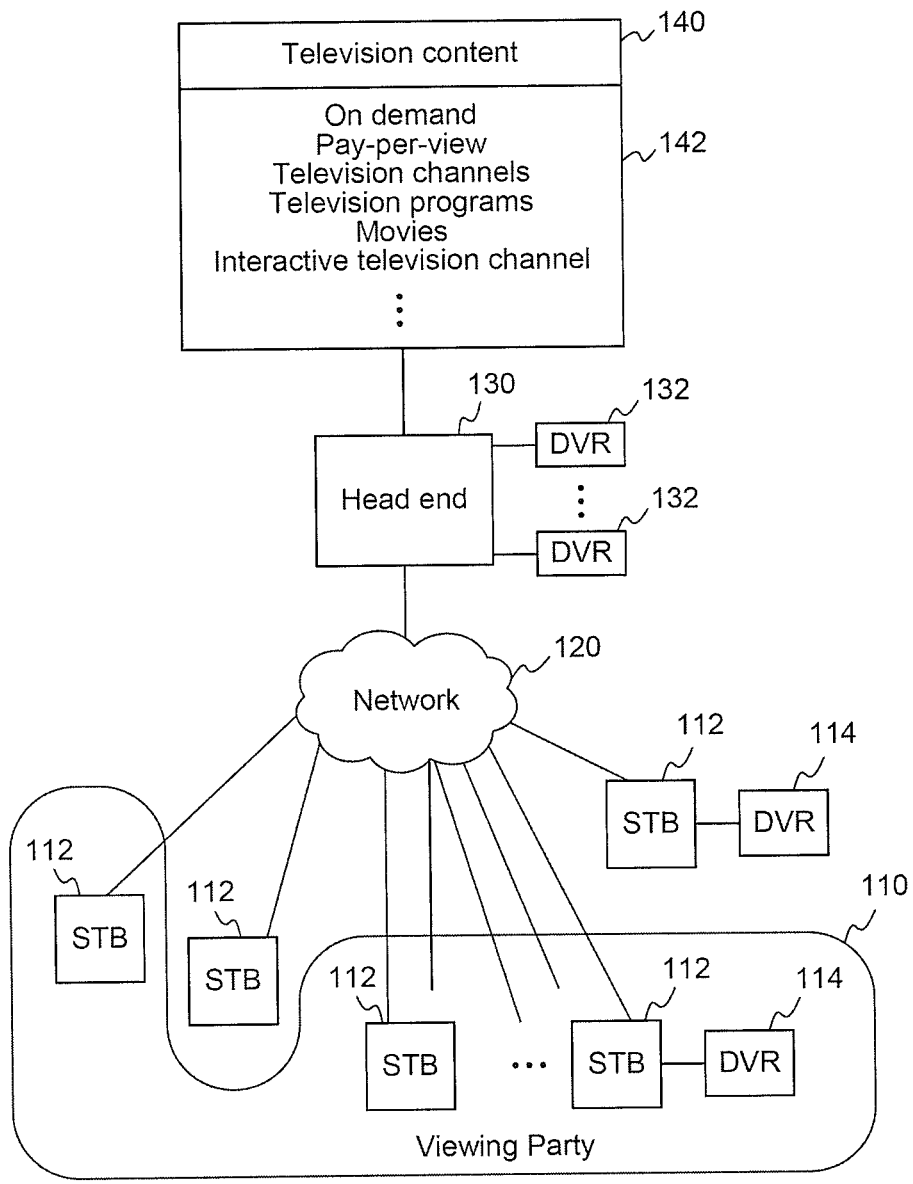
FIG. 1 is a block diagram of an architecture of a virtual communal television viewing system including a viewing party according to an embodiment.

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

The specific illustrations and embodiments are described with respect to television content in connection with voice communication and other forms of communication including video conferencing. Television content may include television programs, television channels, interactive television programs, and any other similar content. Embodiments also may be associated with various platforms including personal computers, cellular telephones, personal digital assistants (PDAs), tablets (e.g., Apple® iPad™), and other mobile devices, Internet Protocol (IP)-based telephones using voice over IP (VOIP), and other systems compatible with voice communication, video conferencing, user interfaces, and/or a network connection such as the Internet. References to such functionality therefore should be interpreted to include these and other similar systems.

Embodiments may be implemented on any type of computing device. Such computing device may include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, a computing device such as a server may be a clustered computing environment or server farm.

Voice communication, such as voice chat among users, may be used in a social networking system for cable television viewers/users. The users may watch television content as a virtual group in the social networking system. Each user may watch television content in the user's own home, while simultaneously communicating with other users via voice and/or video conference/chat. This virtual communal television watching and discussion session is called a viewing party. The system enables a user to find friends/buddies and other users, even if the other users are not already known to the user, and form a public or open viewing party that any user may join. Users can also initiate a private viewing party with other users, accessible only by invitation. Users can further initiate a private two-party conference, called a side bar, even while participating in a viewing party. In some embodiments, the system further enables participants in a viewing party to synchronize their viewing sessions, so that all participants share a common viewing experience. Users may enjoy the social experience of communal viewing for any television program of their choosing, including live programs. Users can easily find other like-minded individuals to share and synchronize viewing experiences. Characteristics of communal viewing groups and/or users may be analyzed for advertising and other applications.

FIG. 1 is a block diagram of an architecture of a virtual communal television viewing system 100 including a viewing party 110 according to an embodiment. Viewing party 110 may be formed by one or more users, and may include various users regardless of their geographical location. In the embodiment of FIG. 1, users may be associated with set-top boxes (STBs) 112. A user may participate in viewing party 110 through various systems, including televisions, computers, mobile devices, digital video recorders (DVRs) 114, and the like. STBs 112 are connected to network 120, which is connected to head end 130. Although DVRs 114 are illustrated as standalone devices connected to STBs 112, DVR functionality can be integrated into STBs 112 to provide DVR STB functionality. Thus, references to STBs throughout the specification and drawings include references to DVR STBs.

Head end 130 provides television content 140, including various types of content 142 such as on demand, pay-per-view, television channels, television programs, movies, interactive television channels, and the like. Head end 130 may provide television content 140 to STBs 112 via network 120. Television content 140 may be recorded by a user at DVR 114, and may be provided back to a user from that user's DVR 114. Head end 130 may include a DVR 132 for each user, to provide remote storage DVR (RS-DVR) or network DVR (nDVR) functionality for the users. Accordingly, television content 140 may be recorded by a user at DVR 132 and provided back to the user from DVR 132 over the network 120. Any of head end 130, DVR 132, STB 112, and DVR 114 may be implemented as a controller. Thus, a controller may provide central control (e.g., at the head end 130), distributed control (across STBs 112), or a combination of the two.

Figure 2A:
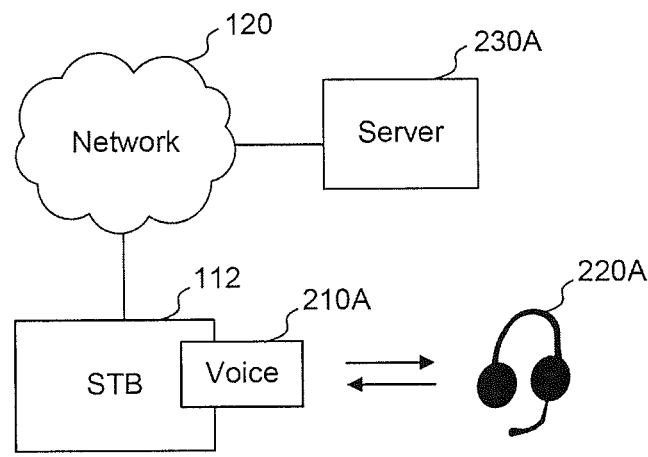
FIG. 2A is a block diagram of an architecture of a virtual communal television viewing system including voice communication according to an embodiment.

FIG. 2A is a block diagram of an architecture of a virtual communal television viewing system 200A including voice communication according to an embodiment. As illustrated, STB 112 includes a voice module 210A. Voice module 210A may provide video or other forms of conferencing. STB 112 is connected to network 120, which is connected to server 230A. Server 230A may be a voice and/or video conferencing server in communication with other modules/servers. Accordingly, voice module 210A and server 230A enable voice communication for users of the STB 112. Voice headset 220A provides the user with an interface to voice module 210A. Voice headset 220A may be wired or wireless. In an embodiment, a wireless Bluetooth voice headset 220A communicates wirelessly with a Universal Serial Bus (USB) voice module 210A connected to a USB port of the STB 112.

Viewing parties may utilize voice communication, including voice-based chat, to enable users to communicate with each other and enjoy a communal viewing experience. Other forms of communication may be used, including webcam/visual communication such as video conferencing. Voice module 210A may pass the voice communication to other voice modules 210A, or to the head end 130, without the use of server 230A.

Figure 2B:
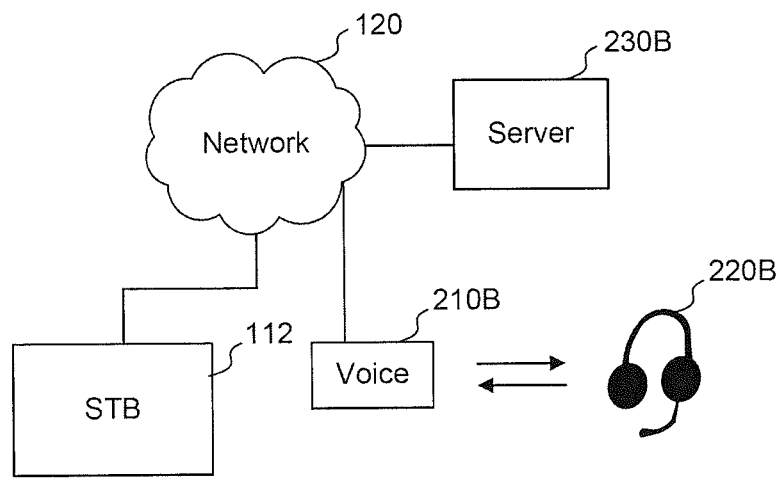
FIG. 2B is a block diagram of an architecture of a virtual communal television viewing system including voice communication according to an embodiment.

FIG. 2B is a block diagram of an architecture of a virtual communal television viewing system 200B including voice communication according to an embodiment. STB 112 and server 230B are connected to network 120. Unlike FIG. 2A, the voice module 210B of FIG. 2B is separate from STB 112. For example, voice module 210B may be a WiFi base station or module that connects to network 120 (e.g., via a network gateway at the user's premises). Voice module 210B may implement Voice over Internet Protocol (VoIP, Voice over IP) to interconnect with other users or with server 230B for voice/video conferencing and/or voice chat.

Voice headsets 220A and 220B in FIGS. 2A and 2B may utilize standard telephony technology, such as Digital Enhanced Cordless Telecommunications (DECT), to connect to a base station that interfaces via a conventional RJ11 telephony interface. The voice communication may operate strictly as a private voice network, which does not connect to the public switched telephone network (PSTN), even though a conventional RJ11 telephone interface is used.

The voice communication system may fail to enable, or specifically disable, direct dialing from one terminal to another. Connections between terminals may be controlled centrally. For example, connections may be initiated from a server or switch at the head end 130. Connections may be initiated in response to commands issued by a separate control system, such as an on-screen chat control interface provided to the user. The voice communication system my be configured to automatically answer (go offhook) upon receiving an incoming call or request to chat, or may audibly ring and enable the user to manually answer an incoming call/chat request. The voice communication system may also enable voice connections to be automatically initiated when a user manually takes a headset offhook or otherwise initiates voice communication. Voice connections may be established to a system-controlled element such as a head end module or voice conferencing server.

Figure 3:
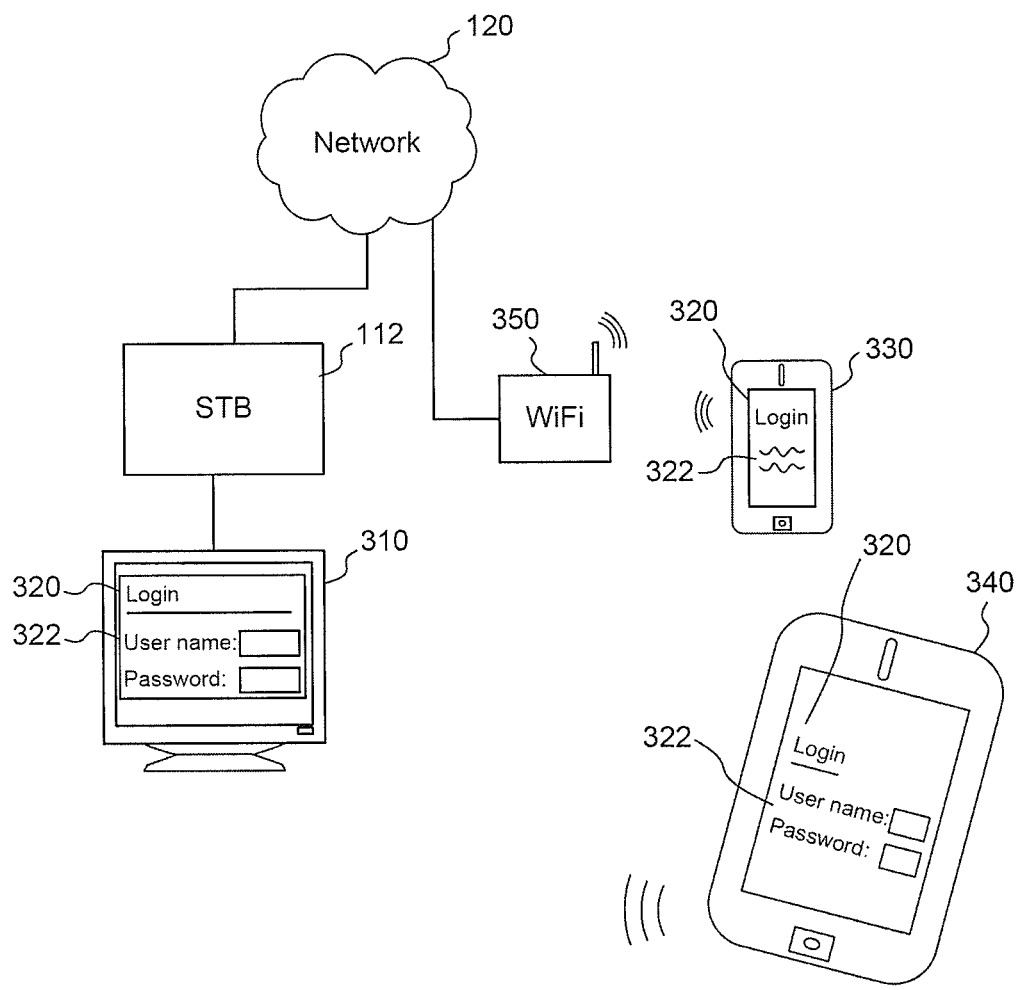
FIG. 3 is a block diagram of an architecture of a virtual communal television viewing system including a user interface according to an embodiment.

FIG. 3 is a block diagram of an architecture of a virtual communal television viewing system 300 including a user interface 320 according to an embodiment. STB 112 is connected to network 120. A television 310 is connected to STB 112. Television 310 displays user interface 320 to the user. For example, a user may log in to an account that provides the user with an identity for the communication system. User account information 322, including username and password, enable the user identity to be maintained separately from a household identity and/or other users in a household. The user identity provides the system with information about the user.

Additional devices can be used to interact with the system. For example, mobile devices 330 and 340 (e.g., a mobile phone and a tablet) can communicate wirelessly with gateway 350, which is connected to the network 120. Mobile devices 330 and 340 may be used to provide voice/video chat capabilities including speakerphone functionality and wired or wireless headset capability (e.g., Bluetooth headset connection to the mobile devices 330 and 340, which use Wi-Fi to send and receive the voice/video communication to gateway 350), as well as serving to display a user interface 320 and television content. Users may interact through user interface 320, passing user commands to mobile devices 330 and 340, television 310, STB 112, and/or head end 130. Similarly, content may be controlled at any of mobile devices 330 and 340, television 310, STB 112, and/or head end 130. For example, head end 130 can be configured to receive a user command and initiate playback of pay-per-view content in response. Any of the devices may respond to user commands and/or execute operations. STB 112 may include DVR functionality responsive to user commands to initiate playback of content, including recorded content. Mobile device 330 may respond to user commands for navigating menus and providing information on other users and viewing parties. Functionality, responsiveness, and control is not limited to any specific device, whether user-side or head end side. Operations and control may be distributed throughout any device.

FIGS. 4A-4G are block diagrams of user interfaces 400A-400G for a virtual communal television viewing system according to an embodiment. Interfaces 400A-400G are intended as conceptual renderings of information that may be displayed, and are not necessarily specific implementations. A preferred embodiment can render different parts of the information depicted using different screens 400A-400G of the user interface, easily navigable by users.

Figure 4A:
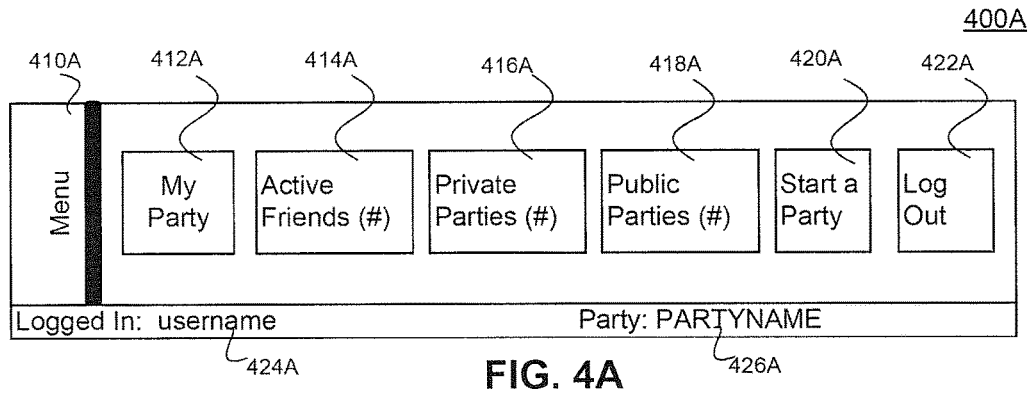
FIG. 4A is a block diagram of a user interface for a virtual communal television viewing system according to an embodiment.

FIG. 4A is a block diagram of a user interface 400A for a virtual communal television viewing system according to an embodiment. User interface 400A may include a menu 410A including menu items such as My Party 412A, Active Friends (#) 414A, Private Parties (#) 416A, Public Parties (#) 418A, Start a Party 420A, and Log Out 422A. The user interface 400A can include additional menu items and/or modules not specifically illustrated, and various menu items and/or modules can be combined with each other and/or otherwise modified. Menu items can include a status indication, represented by (#) in FIG. 4A. The status indication can substitute a number for the # symbol, corresponding to the number associated with the menu item. For example, menu item 414A can display Active Friends (9), indicating that the username currently has nine active friends. The currently logged in username is displayed in the Logged In status 424A. The current party associated with the username is displayed in the Party status 426A.

Figure 4B:
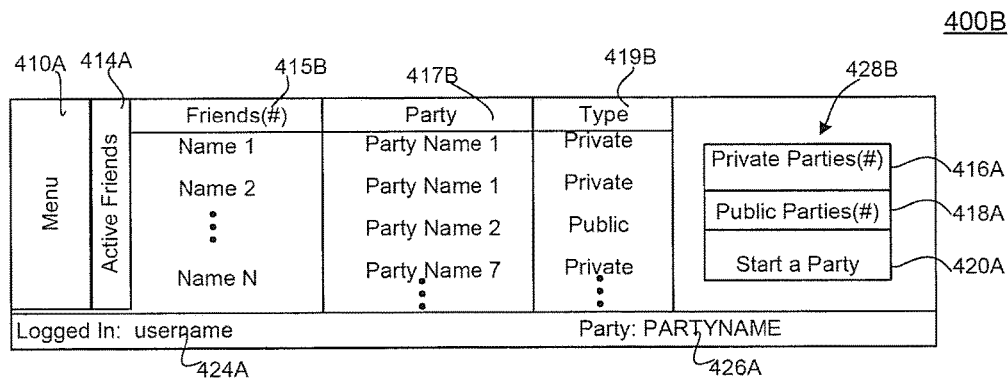
FIG. 4B is a block diagram of a user interface for a virtual communal television viewing system according to an embodiment.

FIG. 4B is a block diagram of a user interface 400B for a virtual communal television viewing system according to an embodiment. Menu 410A is accompanied by menu item 414A Active Friends, indicating that the user interface 400B is displaying information relevant to a user's active friends. The column associated with Friends (#) 415B lists the currently active friends, and the symbol # is replaced by a number corresponding to the currently active friends. Column 417B lists the names of parties associated with each friend. Column 419B lists the status of each party, e.g., whether it is public or private. Mini-menu 428B provides menu items in a conveniently accessible location, enabling a user to choose activities associated with menu 410A as illustrated in FIG. 4A. Voice connections and conferencing may be controlled using the on-screen user interface illustrated in FIG. 4B. For example, a user can select from the list of users 415B, and enter into a private chat ("Side Bar").

Figure 4C:
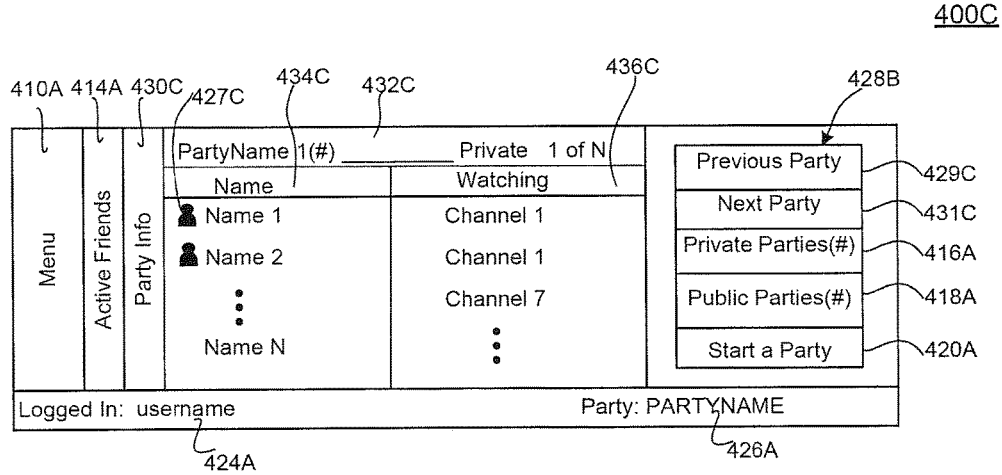
FIG. 4C is a block diagram of a user interface for a virtual communal television viewing system according to an embodiment.

FIG. 4C is a block diagram of a user interface 400C for a virtual communal television viewing system according to an embodiment. A user has selected to view information associated with PartyName1. The selection is indicated by the additional menu entry 430C Party Info. Header 432C indicates that PartyName1 has been selected, using the # symbol to indicate the number of users (Names) associated with PartyName1. Column Name 434C includes a list of user names. Status indication 427C, indicates, for each user associated with the party, whether the user is a friend. Though not specifically illustrated, additional indicators may be used to indicate status such as private, away, busy, and available; current activity such as channel being watched, current viewing party; and the like. Column Watching 436C indicates a channel that each user is watching. The information in user interface 400C enables a user to evaluate information regarding a party, and decide whether to join. Mini-menu 428B includes the information shown in FIG. 4B, and has been augmented to include further information relevant to the party info 430C menu item: Previous Party 429C, and Next Party 431C.

Figure 4D:
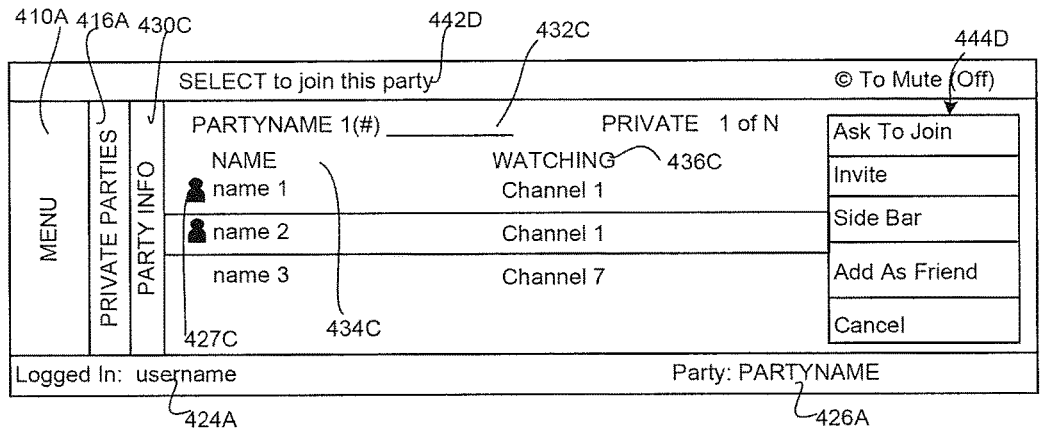
FIG. 4D is a block diagram of a user interface for a virtual communal television viewing system according to an embodiment.

FIG. 4D is a block diagram of a user interface 400D for a virtual communal television viewing system according to an embodiment. User interface 400D includes an information banner 442D, indicating a context-sensitive action that may be taken corresponding to the currently selected element of user interface 400D. As indicated in FIG. 4D, Name2 has been selected. In response, pop-up menu 444D is activated. Pop-up menu 444D includes additional options that a user may select including joining a private chat ("Side Bar") or performing/requesting additional actions corresponding to the selected user's Name, as illustrated. Although user interface 400D is illustrated with menu item 416A corresponding to private parties, user interface 400D may be modified to apply to public parties, with similar information displayed for menu item public parties 418A shown in FIG. 4A.

Figure 4E:
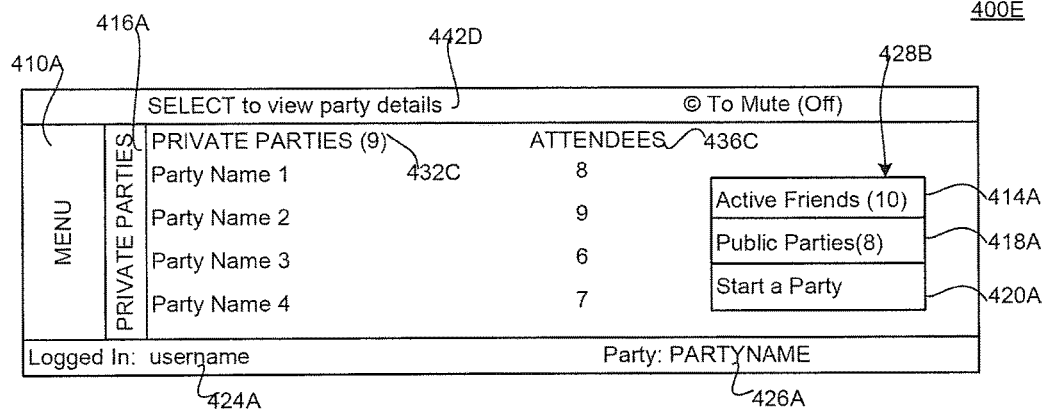
FIG. 4E is a block diagram of a user interface for a virtual communal television viewing system according to an embodiment.

FIG. 4E is a block diagram of a user interface 400E for a virtual communal television viewing system according to an embodiment. User interface 400E displays menu item 416A Private Parties, including column 432C Private Parties and column 436C Attendees. The information banner 442D displays a hint regarding selection of a PartyName. Mini-menu 428B is updated to reflect additional menu items 414A, 418A, and 420A. User interface 400E may be modified to present similar information for menu item 418A Public Parties and menu item 412A My Party shown in FIG. 4A, with mini-menu 428B updated accordingly to include other relevant menu items.

Figure 4F:
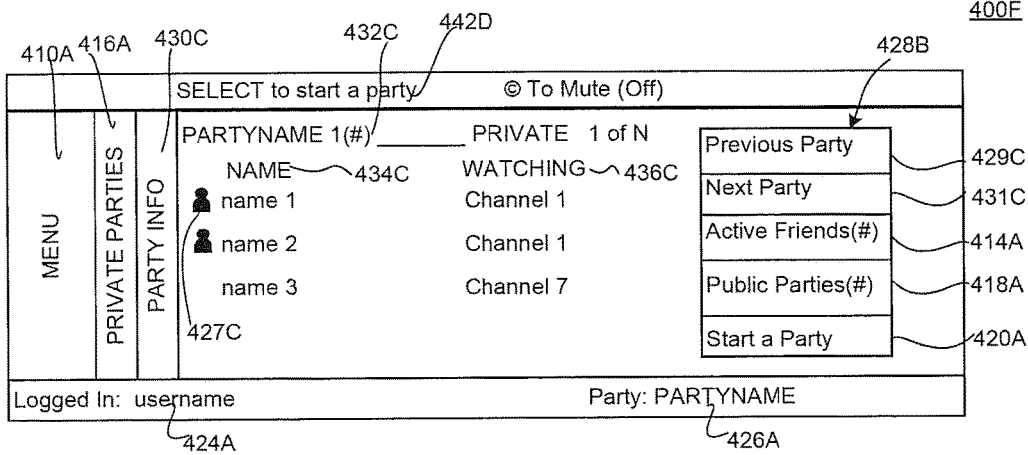
FIG. 4F is a block diagram of a user interface for a virtual communal television viewing system according to an embodiment.

FIG. 4F is a block diagram of a user interface 400F for a virtual communal television viewing system according to an embodiment. Similar to user interface 400C of FIG. 4C, user interface 400F displays information associated with a selected PartyName. However, in contrast to FIG. 4C, user interface 400F displays a different set of menu items under menu 410A, and a different set of items under mini-menu 428B. This is because the user interface 400F was arrived at by navigating to Party Info 430C under menu item Private Parties 416A. In contrast, user interface 400C was navigated to under Active Friends 414A. Thus, the user interfaces are flexible to provide desired information regardless of specific path through the menus that a user has taken. User interface 400F can be used to display similar information corresponding to public parties, effectively switching the position of menu item 416A with mini-menu item 418A.

Figure 4G:
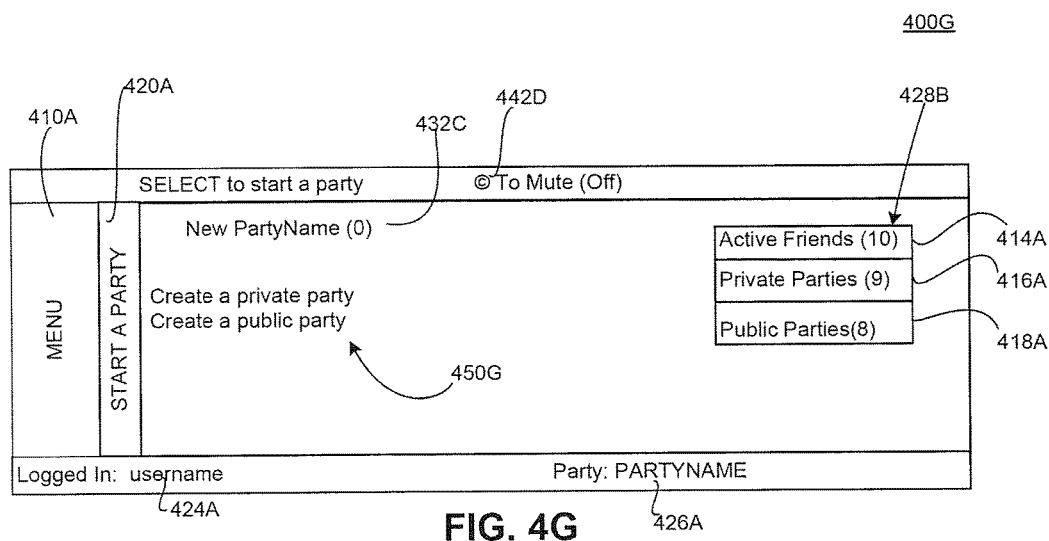
FIG. 4G is a block diagram of a user interface for a virtual communal television viewing system according to an embodiment.

FIG. 4G is a block diagram of a user interface 400G for a virtual communal television viewing system according to an embodiment. User interface 400G displays information 450G associated with menu item 420A Start a Party, and other information as described above.

The various user interfaces enable users to locate other users and/or viewing parties that are of interest to the user. For example, a user can filter the list of Friends 415B and/or viewing Parties 417B to provide more focused information. The system can enable a user to focus on a program of interest, and display a list of accessible viewing Parties 417B. The system also can display a list of accessible parties associated with the user's currently-tuned channel or program, and can display a list of users who are tuned to the same channel or viewing the same program as the user.

The system may be configured to group common programs or channels together. For example, the system may automatically group high definition (HD) and standard definition (SD) versions of a channel, so that users can easily find others watching the same program in different formats using different equipment. The HD/SD status can be included as a separate attribute in the user interfaces, and the status can be included in a program's name. Lists of viewing parties 417B and users 415B also may be filtered based on the HD or SD status of content.

Figure 5:
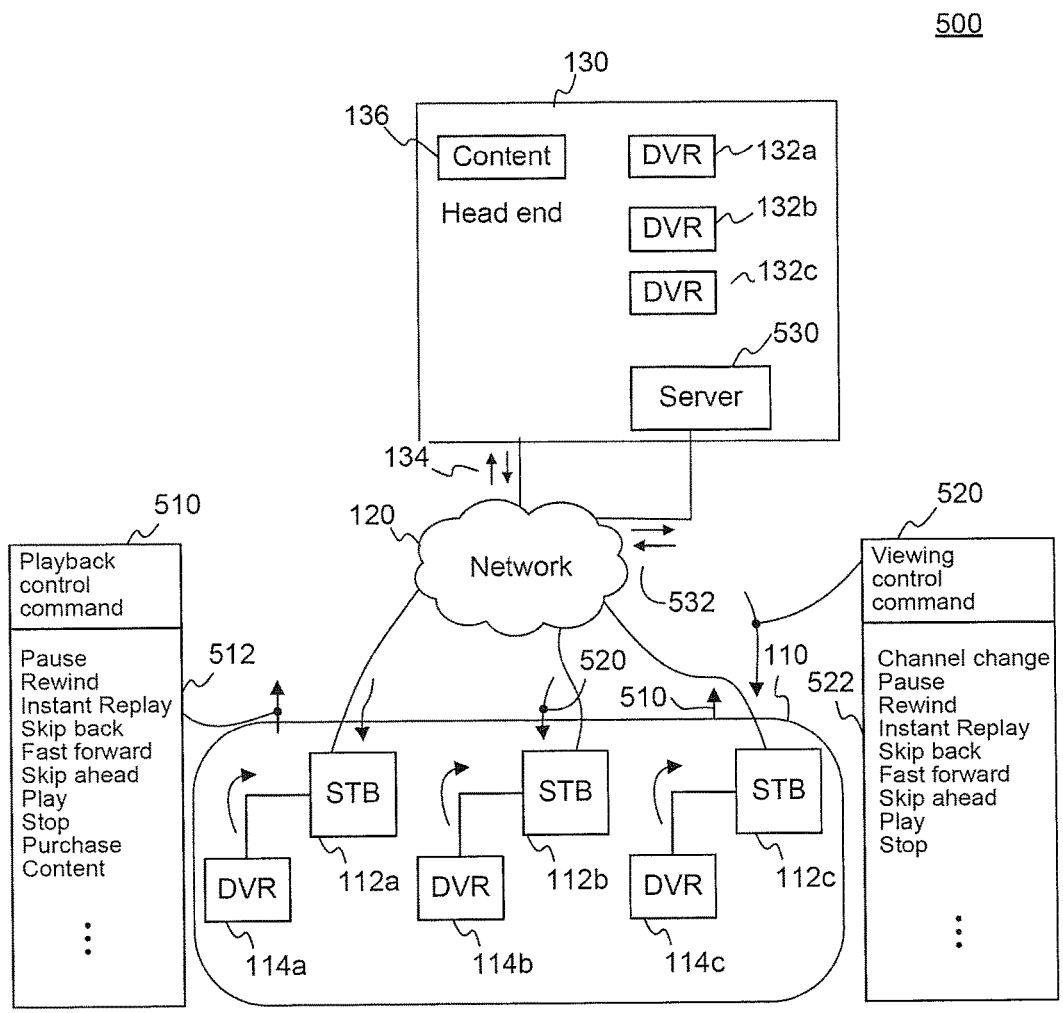
FIG. 5 is a block diagram of an architecture of a virtual communal television viewing system including playback and viewing control commands for synchronized content according to an embodiment.

FIG. 5 is a block diagram of an architecture of a virtual communal television viewing system 500 including playback control commands 510 and viewing control commands 520 for synchronizing viewing party 110 according to an embodiment. Each STB 112a, 112b, and 112c is connected to the network 120. As illustrated, each STB 112a, 112b, and 112c is connected respectively to a DVR 114a, 114b, and 114c. While DVRs are illustrated as separately connected to STBs, DVR functionality can be integrated into STBs to provide DVR STB functionality in STBs 112a, 112b, and 112c. Television content 136 is provided by head end 130 via network 120. Head end 130 may include remote storage or network DVRs 132a, 132b, and 132c for use by users of STBs 112a, 112b, and 112c, respectively. Accordingly, television content may be sent and/or received via head end 130, DVRs 114a, 114b, and 114c, and/or DVRs 132a, 132b, and 132c. A server 530 is connected to network 120.

Viewing party 110 includes three users, represented in FIG. 5 as STBs 112a, 112b, and 112c. Viewing of television content 136 by each user may be entirely self-controlled. A user may join a viewing party 110 and engage in voice communication with other users, and that user may retain full ability to control the user's own STB, DVR or other delivery of television content 136 (e.g., change channels, pause, rewind, etc.) independent of the viewing party 110.

Participants in viewing party 110 may also choose to synchronize their viewing experience. A synchronized viewing experience may include enabling one or more participants (e.g., an operator and/or viewer) to control the viewing and/or playback experience for one or more viewers. For example, in a synchronized viewing party 110 illustrated in FIG. 5, when a participant with control, e.g., a viewer using STB 112a changes channels, the STBs 112b and 112c of other viewers also change channels. When a participant with control pauses, rewinds, or fast forwards a program, the program being viewed by the other users also pauses, rewinds, or fast forwards. Such a synchronized playback control command 510 may include various playback control commands 512, and may be performed by STBs with built-in/associated DVR functionality and/or DVRs 114a, 114b, and 114c. Such commands also may be implemented using network-based DVRs 132a, 132b, and 132c including RS-DVRs.

Playback of recorded television content 136 may be synchronized for viewing party 110. For example, television content 136 may be stored locally by each user at DVRs 114a, 114b, and 114c, remotely by each user at remote network-based DVRs 132a, 132b, and 132c, or some combination of remote and local storage. Synchronized playback of recorded television content 136 also may be restricted. For example, synchronized playback may be enabled only for users who have a stored copy of the television content 136, and participation, joining, or remaining a member of a viewing party 110 may be conditioned on the user having a stored copy of the television content 136 to be synchronized for the viewing party 110. Synchronized playback also may be enabled for video on demand (VOD) and subscription video on demand (SVOD) television content 136. For example, if each participant has purchased the same transactional VOD program, or each participant has a subscription providing access to an SVOD program, playback of the program can be synchronized for a viewing party 110.

Synchronization may be controlled at a centralized location such as head end 130 (including server 530) using synchronized commands 134 and 532, respectively. Server 530 may be implemented as a telecommunication server to facilitate voice communication or sending/receiving other content including television and interactive content. Although illustrated as integrated into head end 130, server 530 may be separate from head end 130. Synchronization may also be controlled by a distributed client running on the STBs 112a, 112b, and 112c participating in the viewing party, such that the STBs communicate with each other without an intervening server. In an embodiment, a system may not require special action to precisely synchronize playback of separately recorded television content, because system clocks associated with STBs 112a, 112b, and 112c (and/or DVRs 114a, 114b, and 114c, and/or DVRs 132a, 132b, and 132c) are kept sufficiently synchronized such that users do not perceive any synchronization problems in playing back the separate recordings of the television content. In another embodiment, a system may use reference data, such as a Program Clock Reference (PCR) to precisely synchronize playback of separate recordings.

Synchronized playback may be initiated by one or more participants via playback control command 510. As illustrated in FIG. 5, two users (associated with STBs 112a and 112c, respectively) may issue playback control commands 510 for controlling the viewing party 110. Various delegation modes may be used to reconcile and/or prioritize commands from more than one user. Such commands 512 may include pause, rewind, instant replay, skip back, fast forward, skip ahead, play, stop, ordering and/or initiating playback of content to which the user already has rights and/or where no purchase is necessary, and other commands that control playback of television content 136 for one or more users. Commands 510 for synchronized playback of recorded television content 136 also may be associated with special features, such as the ability for a participant to begin playback using a stored bookmark, and having users automatically begin playback at a suitably synchronized bookmark location in the television content.

Synchronized viewing by users in the viewing party 110 may be controlled by viewing control command 520. Commands 522 for viewing control may include channel change, pause, rewind, instant replay, skip back, fast forward, skip ahead, play, stop, and other commands that may affect a user's STB or other television content viewing device. As illustrated in FIG. 5, viewing control commands 520 may be received by one or more users of STBs 112a, 112b, and 112c. Synchronized viewing may also be responsive to viewing control commands that cause a user's device (e.g., STBs 112a, 112b, and 112c) to be force-tuned/force-played to display the synchronized television content. Embodiments also may verify that a user is tuned to or otherwise playing back the television content to be synchronized for the viewing party.

Synchronized playback of television content 136 may also include video on demand content. Video on demand content may include content available as free on demand, content subscribed to by each viewer in an associated Subscription Video on Demand (SVOD) package, pay per view (PPV), and other content, including PPV on demand content such as newly released movies. The system may enable one or more users and/or operators to order paid content for the viewing party 110 at a special (e.g., discounted) viewing party price, which may allow shared/virtual communal viewing of the paid content by all participants of the viewing party 110. In one preferred embodiment, one user acting as operator orders paid content, the cost of which is charged solely to his account. A controlling user can pay the cost, or controlled users can authorize the purchase by the controlling user of paid content on behalf of the controlled users. Synchronized playback of the content is then initiated to other users automatically. In another preferred embodiment, one user acting as operator orders the paid content, but each individual user must approve a charge to their account in order to participate. Alternate embodiments, such as where each user independently orders the paid content, or where one user acting as operator is able to authorize purchase for other users, are also possible.

Figure 6:
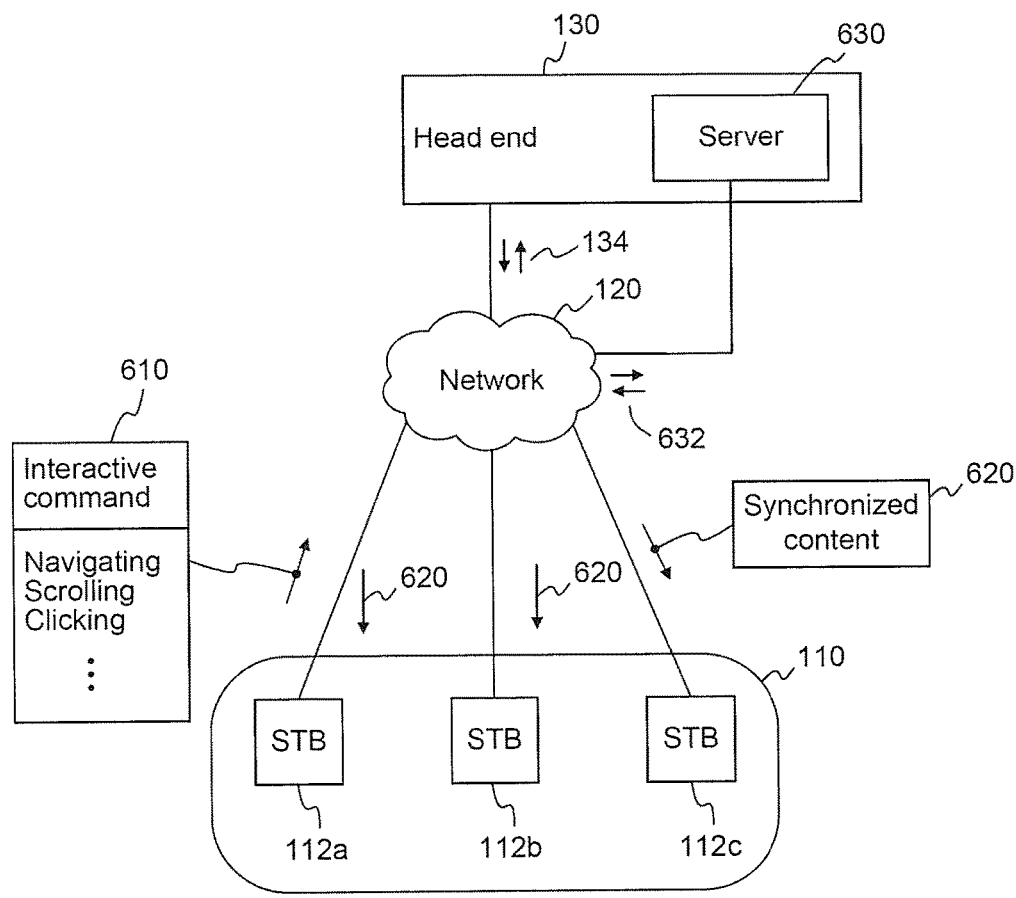
FIG. 6 is a block diagram of an architecture of a virtual communal television viewing system including interactive commands for synchronized content according to an embodiment.

FIG. 6 is a block diagram of an architecture of a virtual communal television viewing system 600 including interactive commands 610 according to an embodiment. STBs 112a, 112b, and 112c are connected to network 120, which is connected to head end 130 and server 630. STBs 112a, 112b, and 112c are associated as a viewing party 110.

In the embodiment of FIG. 6, server 630 may be associated with interactive content, for example content from a website or an interactive television program. Head end 130 also may provide interactive content. Although illustrated as integrated into head end 130, server 630 may be separate from head end 130. Interactive content may be communicated to STBs 112a, 112b, and 112c from head end 130 and server 630.

Embodiments enable viewing parties 110 to experience synchronized content beyond conventional video, including synchronized viewing of interactive channels, websites, or other applications. Content may include local news content, real estate advertisements, car advertisements, classified ads, Internet websites, streaming video from Internet websites, and other content capable of being transmitted over network 120. The system may enable users in viewing party 110 to watch a synchronized interactive channel/application session. Such sessions could also be STB-based, e.g., STBs running a browser or other application, with operator commands distributed to the users synchronously, to produce synchronized results.

A user associated with an STB 112a or other device associated with the viewing party 110 (e.g., computing device) may issue interactive command 610 to interact with the interactive content. Commands may include navigation, scrolling, clicking, and other instructions for interacting with content to enable navigation, discovery, playback, and so on regarding the interactive content. Such commands may be communicated to server 630 via communication 632, and may be communicated to head end via communication 134. Synchronized content 620 may be generated responsive to the interactive commands 610 and sent to each user associated with STBs 112a, 112b, and 112c. Synchronized content 620 may be generated by server 630 and/or head end 130.

As an example, a viewing party 110 may include a real-estate agent and interested potential home buyers. The real estate agent may access interactive television content such as "Optimum Homes" and interact with the website as the real estate agent guides the potential home buyers through the interactive content. The real estate agent and potential home buyers receive a synchronized experience, with the real estate agent controlling interaction with the interactive content.

Figure 7:
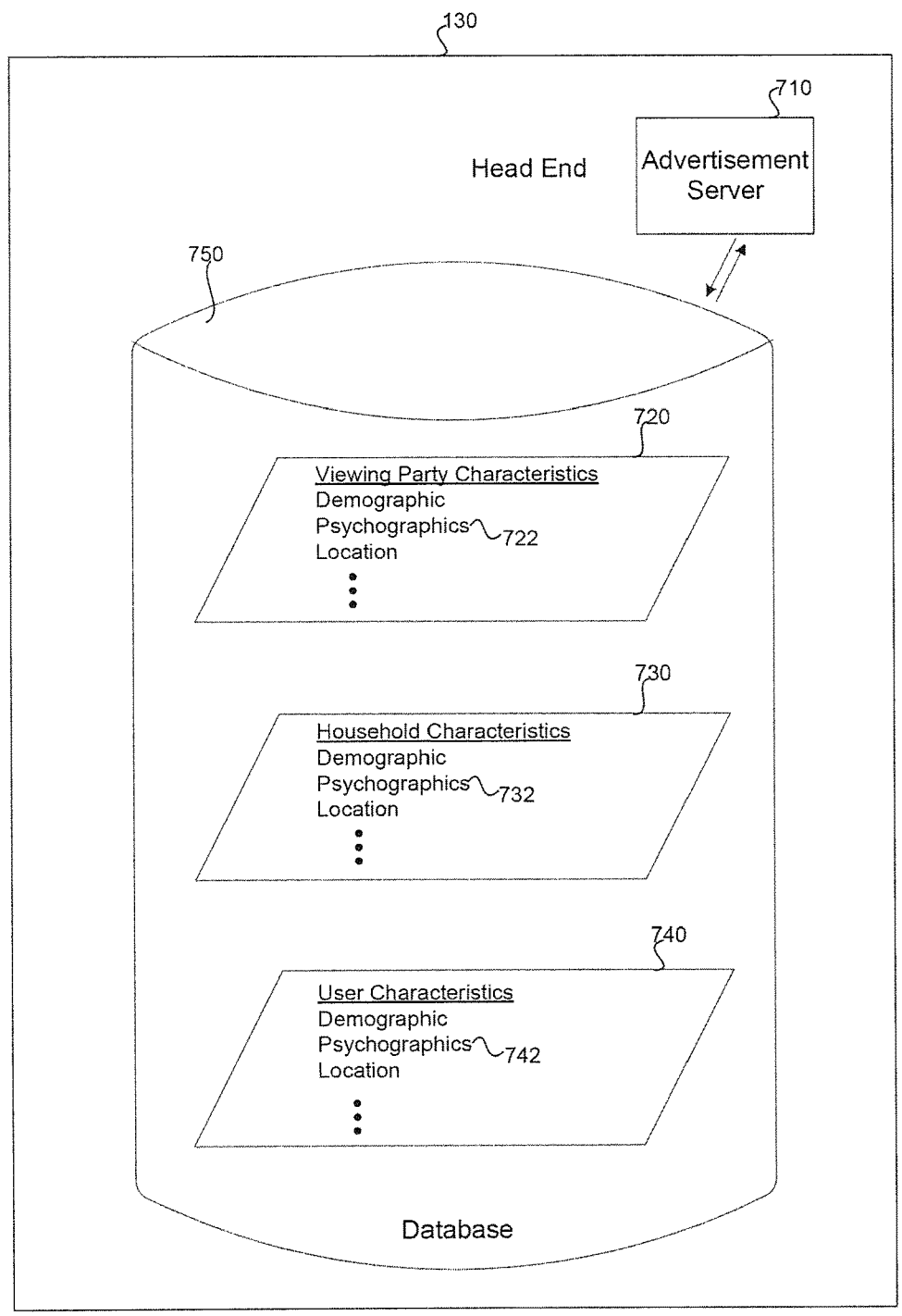
FIG. 7 is a block diagram of an architecture of a virtual communal television viewing system including an advertisement system according to an embodiment.

FIG. 7 is a block diagram of an architecture of a virtual communal television viewing system 700 including an advertisement system according to an embodiment. Head end 130 includes advertisement server 710 and database 750. Advertisement server 710 and database 750 may communicate with each other regarding viewing party characteristics 720, household characteristics 730, and user characteristics 740. Although illustrated in FIG. 7 as integrated into head end 130, advertisement server 710 and/or database 750 may be separate from head end 130. Advertisement server 710 and/or database 750 also may communicate with other servers, databases, head ends and viewing devices (e.g., STBs and/or DVRs) to obtain viewing party characteristics 720, household characteristics 730, and user characteristics 740. For example, advertisement server 710 may communicate with a server regarding information associated with advertisers and characteristics of the advertisements to be shown to users. Such advertiser-specific information also may be hosted on advertisement server 710 and/or head end 130.

Viewing party characteristics 720 may include demographics, psychographics, location, and other characteristics 722 regarding a viewing party. Party characteristics 720 may include the number of members of a party, and may include the very existence of a viewing party (i.e., members of a party >1). Household characteristics 730 may include demographics, psychographics, location, and other characteristics 732 regarding a household. User characteristics 740 may include demographics, psychographics, location, and other characteristics 742 regarding a user. The viewing party characteristics 720, household characteristics 730, and user characteristics 740 may be communicated to advertisement server 710. In an embodiment, the characteristics may be stored in one or more databases 750. An ad targeting/selection module (not shown) can read the characteristics from the one or more databases 750 and apply rules and/or criteria to select a particular ad. Viewing party characteristics 720 may be associated with one or more household characteristics 730 and/or user characteristics 740. Household characteristics 730 may be associated with one or more user characteristics 740.

Advertisements may be targeted (e.g., by an operator) to demographic groups of users (a demographic group of users may be represented by a viewing party), or individual users/households. Advertisement server 710 may use additional characteristics for advertisement targeting. For example, participation in a viewing party may be used as an input characteristic used for targeting advertisements.

Embodiments of system 700 may specifically ensure that all participants in a viewing party receive identical advertisements. For example, advertisement server 710 may consider viewing party characteristics 720 and develop targeted advertisements relevant to the entire viewing party. In addition, if the users are distributed such that they are being served by different ad servers, then the ad servers may communicate to ensure synchronization of ads displayed. Furthermore, in some targeted advertising systems, the STB may select one of several ads. In such cases, a server may communicate with the STBs and/or the STBs may communicate among themselves in order to ensure selection of identical ads. Embodiments also may provide different ads targeted individually to different users. For example, advertisement server 710 may consider household characteristics 730 and user characteristics 740 to develop targeted advertisements relevant to each user, such as geographically-based local ad insertions that are relevant to each location of geographically-distributed users and households.

Although embodiments may use household-specific and user-specific characteristics 730, 740 to obtain knowledge on users and households, embodiments may also use viewing party characteristics 720 to refine and/or expand its understanding of a user and/or household that is a member of that viewing party. For example, embodiments may infer household/user characteristics 730, 740 for one user, based on such characteristics of other users in a viewing party. Embodiments may infer that one user in a viewing party (and/or the existence of a user account regardless of viewing party) shares common interests, demographics, or other characteristics with other users.

Advertisement server 710 may also target advertisements based on whether a viewing party has been created and/or used. Advertisement server 710 may determine that a local establishment with facilities for physically hosting a party of users, such as a local tavern, is interested in targeting advertising to users. The tavern may specifically want to target adult users of viewing parties formed in the evening. Such targeting can enhance the success of the tavern's advertisements, because users in viewing parties may be more inclined to socially meet each other face to face, requiring a suitable hosting location for such meetings. Advertisements from the tavern may induce the virtual viewing party to meet in person at the tavern. Advertisement server 710 may determine whether the composition of a viewing party includes socially inclined young adults who are likely to desire social interaction with each other, including showing up as a group to a tavern or bar. Mere membership in a viewing party may allow the advertisement server 710 to infer such characteristics about a user. The advertisement server 710 may determine that a particular location is well suited to a given viewing party based on location information from each user.

In another example, advertisement server 710 may infer that users associated with a viewing party are interested in a sports team, enabling targeted ads from a local sports team store or a local bar associated with the sports team.

Synchronized ads for a virtual communal viewing party, in contrast to non-synchronized ads, enable various benefits for advertisers. For example, synchronized ads may enable discussion among users in a viewing party who each see the advertisement, enabling users to rewind and view the advertisement again while discussing it. Viewing parties may cross geographical advertising regions, enabling synchronized ads to reach regional users who may not otherwise see that local advertisement. Ads may be synchronized independent of demographics or geographic region.

Figure 8:
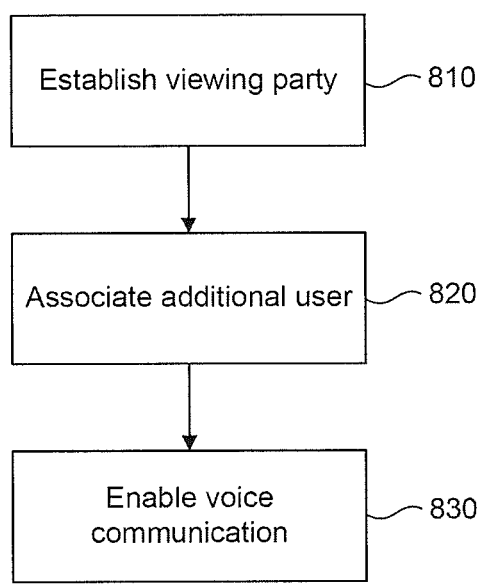
FIG. 8 is an example flowchart based on a virtual communal television viewing method according to an embodiment.

FIG. 8 is an example flowchart based on a virtual communal television viewing method 800 according to an embodiment. In step 810, a viewing party is established. In step 820, an additional user is associated with the viewing party. In step 830, voice communication is enabled between the additional user and the viewing party.

Figure 9:
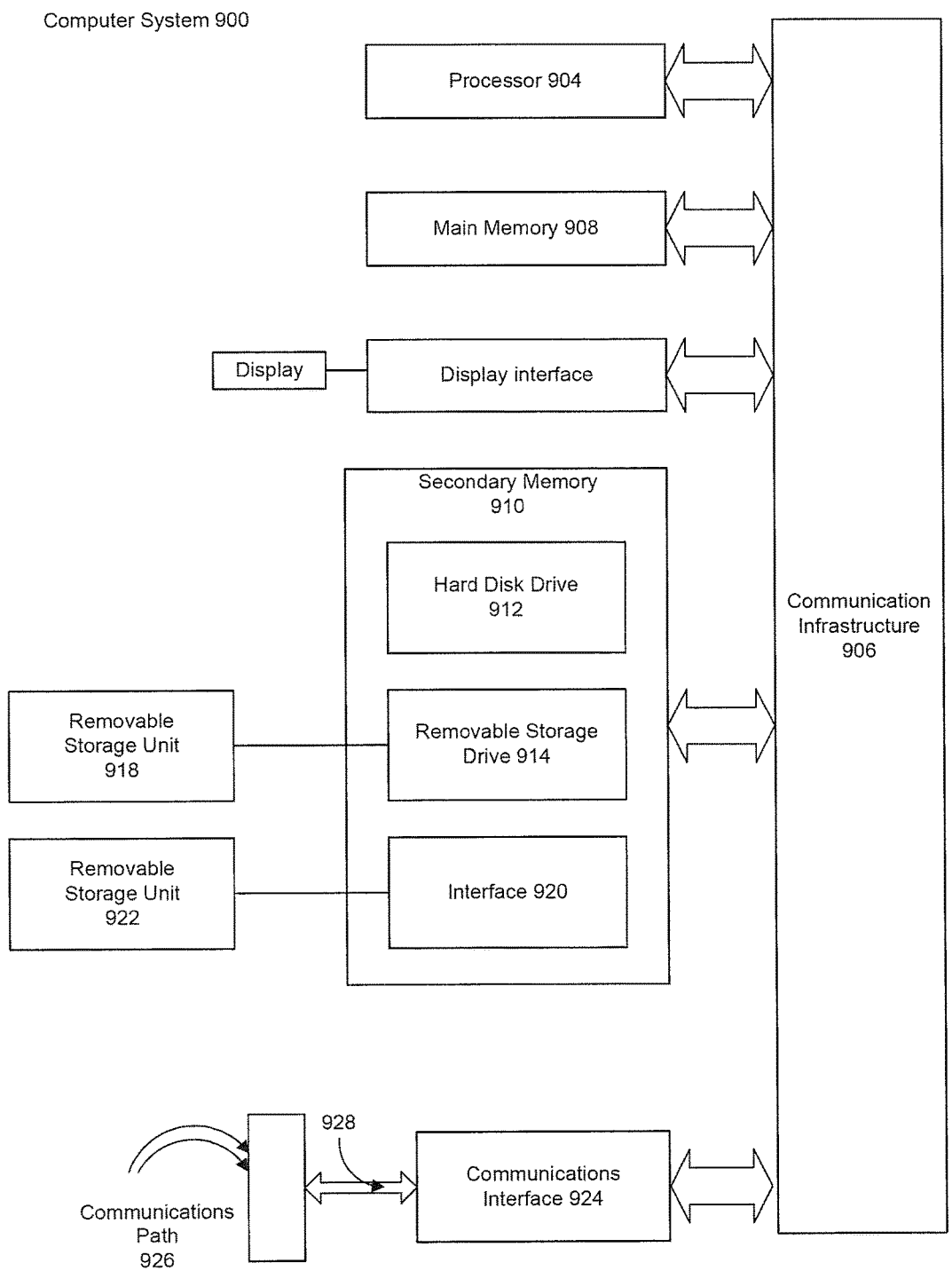
FIG. 9 is a block diagram of an exemplary computer system on which embodiments can be implemented.

FIG. 9 is a schematic diagram of an example computer system 900 used to implement embodiments of virtual communal television viewing, and/or other systems. Various aspects of the various embodiments can be implemented by software, firmware, hardware, or a combination thereof. FIG. 9 illustrates an example computer system 900 in which an embodiment, or portions thereof, can be implemented as computer-readable code. Various embodiments are described in terms of this example computer system 900. After reading this description, it will become apparent to a person skilled in the relevant art how to implement embodiments using other computer systems and/or computer architectures.

Computer system 900 includes one or more processors, such as processor 904. Processor 904 can be a special purpose or a general purpose processor. Processor 904 is connected to a communication infrastructure 906 (for example, a bus or network).

Computer system 900 also includes a main memory 908, preferably random access memory (RAM), and may also include a secondary memory 910. Secondary memory 910 may include, for example, a hard disk drive 912 and/or a removable storage drive 914. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art(s), removable storage unit 918 includes a tangible computer readable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (e.g., an Ethernet card), a communications port, a PCMCIA slot and card, or the like. Software and data transferred via communications interface 924 are provided to communications interface 924 via a communications path 926. Communications path 926 may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Computer program medium and computer usable medium can also refer to memories, such as main memory 908 and secondary memory 910, which can be memory semiconductors (e.g. DRAMs, etc.). These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement embodiments as discussed herein, such as the system described above. In particular, the computer programs, when executed, enable processor 904 to implement the processes of embodiments. Accordingly, such computer programs represent controllers of the computer system 900. Where embodiments are implemented using software, the software may be stored in a computer program product and loaded into computer system 900 using removable storage drive 914, interface 920, hard drive 912 or communications interface 924.

Described above are systems, apparatuses, and methods for virtual communal television viewing, and applications thereof. It is to be appreciated that the Detailed Description section, and not the Abstract, is intended to be used to interpret the claims. The Abstract may set forth one or more but not all exemplary embodiments of the present invention as contemplated by the inventors, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
    establishing a viewing party to view synchronized content, the viewing party including a plurality of viewers;
    receiving viewing party characteristics associated with the viewing party;
    using the received viewing party characteristics to select a piece of content relevant to the plurality of viewers of the viewing party; and
    synchronizing display of the selected piece of content at set-top boxes (STBs) of corresponding viewers in the viewing party, wherein control of the synchronously displayed piece of content is provided to one or more viewers within the viewing party.

2. The method of claim 1, wherein the selected piece of content is advertisement content.

3. The method of claim 1, wherein the selected piece of content is selected by a first STB from the STBs associated with the viewing party.

4. The method of claim 3, further comprising:
    requesting the STBs to select the piece of content selected by the first STB for synchronous display.

5. The method of claim 1, further comprising:
    requesting one or more servers to select the same piece of content for sending to each STB of the viewing party.

6. The method of claim 1, wherein the viewing party characteristics include information related to one or more of: demographics associated with the viewing party, psychographics associated with the viewing party, a location associated with the viewing party, a number of viewers in the viewing party, or an existence of the viewing party.

7. The method of claim 1, further comprising:
    enabling voice communication between each viewer in the viewing party.

8. The method of claim 1, wherein the one or more viewers within the viewing party are allowed to control the synchronization of the content to each viewer according to an assigned priority.

9. The method of claim 1, wherein the one or more viewers within the viewing party are allowed to control the synchronization of the piece of content to each viewer in response to one of the following commands: ordering, pause, rewind, instant replay, skip back, fast forward, skip ahead, play or stop.

10. A system, comprising:
    a user interface that enables establishing a viewing party that includes a plurality of users to view synchronized content; and
    a head end controller configured to:
        receive viewing party characteristics associated with the viewing party,
        use the received viewing party characteristics to select a piece of content relevant to the plurality of viewers of the viewing party, and
        synchronize display of the selected piece of content at set-top boxes (STBs) of corresponding viewers in the viewing party, wherein control of the synchronously displayed piece of content is provided to one or more viewers within the viewing party.

11. The system of claim 10, wherein the selected piece of content is advertisement content.

12. The system of claim 10, wherein the selected piece of content is selected by a first STB from the STBs associated with the viewing party.

13. The system of claim 12, wherein the head end controller is further configured to request the STBs to select the piece of content selected by the first STB for synchronous display.

14. The system of claim 10, wherein the head end controller is further configured to request one or more servers to select the same piece of content for sending to each STB of the viewing party.

15. The system of claim 10, wherein the viewing party characteristics include information related to one or more of: demographics associated with the viewing party, psychographics associated with the viewing party, a location associated with the viewing party, a number of viewers in the viewing party, or an existence of the viewing party.

16. The system of claim 10, wherein the one or more viewers within the viewing party are allowed to control the synchronization of the content to each viewer according to an assigned priority.

17. The system of claim 10, wherein the one or more viewers within the viewing party are allowed to control the synchronization of the piece of content to each viewer in response to one of the following commands: ordering, pause, rewind, instant replay, skip back, fast forward, skip ahead, play or stop.

18. The system of claim 10, wherein the head end controller is further configured to provide information about:
- a list of accessible viewing parties associated with a program of interest of a first viewer from the one or more viewers,
- a list of accessible viewing parties associated with a currently-tuned channel or program of the first viewer, or
- a list of viewers who are tuned to the currently-tuned channel or program of the first viewer.

19. A non-transitory computer-readable device having instructions stored thereon that, when executed by at least one computing device, cause the at least one computing device to perform operations comprising:
- establishing a viewing party to view synchronized content, the viewing party including a plurality of viewers;
- receiving viewing party characteristics associated with the viewing party;
- using the received viewing party characteristics to select a piece of content relevant to the plurality of viewers of the viewing party; and
- synchronizing display of the selected piece of content at set-top boxes of corresponding viewers in the viewing party, wherein control of the synchronously displayed piece of content is provided to one or more viewers within the viewing party.

* * * * *